United States Patent
Arumugam Maharaja

(10) Patent No.: US 11,947,559 B1
(45) Date of Patent: Apr. 2, 2024

(54) DYNAMIC SCHEMA IDENTIFICATION TO PROCESS INCOMING DATA FEEDS IN A DATABASE SYSTEM

(71) Applicant: Bank of America Corporation, Charlotte, NC (US)

(72) Inventor: Raja Arumugam Maharaja, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/045,192

(22) Filed: Oct. 10, 2022

(51) Int. Cl.
- *G06F 16/20* (2019.01)
- *G06F 16/21* (2019.01)
- *G06F 16/25* (2019.01)
- *G06N 20/00* (2019.01)

(52) U.S. Cl.
CPC .......... *G06F 16/254* (2019.01); *G06F 16/212* (2019.01); *G06N 20/00* (2019.01)

(58) Field of Classification Search
None
See application file for complete search history.

(56) References Cited

U.S. PATENT DOCUMENTS

| | | |
|---|---|---|
| 6,205,451 B1 | 3/2001 | Norcott et al. |
| 7,058,615 B2 | 6/2006 | Yao |
| 7,113,951 B2 | 9/2006 | Ashida et al. |
| 7,490,098 B2 | 2/2009 | Allen et al. |
| 7,512,614 B2 | 3/2009 | Yao |
| 7,702,698 B1 | 4/2010 | Chakravarthy |
| 7,809,763 B2 | 10/2010 | Nori et al. |
| 7,822,710 B1 | 10/2010 | Miller et al. |
| 7,840,603 B2 | 11/2010 | Huang et al. |
| 7,984,019 B2 | 7/2011 | Boyko et al. |
| 8,086,998 B2 | 12/2011 | Bansal et al. |
| 8,200,614 B2 | 6/2012 | Syed et al. |
| 8,321,450 B2 | 11/2012 | Thatte et al. |
| 8,719,769 B2 | 5/2014 | Castellanos et al. |
| 9,218,370 B2 | 12/2015 | Chen et al. |
| 9,594,778 B1 | 3/2017 | Goodwin et al. |
| 9,747,328 B2 | 8/2017 | Wong |
| 10,157,211 B2 | 12/2018 | Benke et al. |
| 10,162,900 B1 * | 12/2018 | Chatterjee ............. G06F 16/334 |
| 10,713,230 B2 | 7/2020 | Weissman et al. |

(Continued)

FOREIGN PATENT DOCUMENTS

| | | |
|---|---|---|
| RU | 2378690 C2 | 1/2010 |
| WO | WO2014144889 A2 | 9/2014 |

*Primary Examiner* — Belix M Ortiz Ditren

(57) ABSTRACT

A data manager receives a first data layout from a data source and classifies the first data layout as corresponding to a first data domain. The data manager compares the first data layout with one or more existing data layouts that are already classified as corresponding to the first data domain and detects that at least one attribute and corresponding dataset of the first data layout matches with a second attribute and corresponding second dataset from an existing data layout. Data manager generates a second data layout corresponding to the first data layout, wherein the second data layout is a copy of the first data layout with the at least one attribute and the corresponding dataset from the first data layout replaced by the second attribute and the second dataset from the first existing data layout. Data manager loads a data warehouse from the second data layout.

20 Claims, 4 Drawing Sheets

(56) References Cited

U.S. PATENT DOCUMENTS

| | | |
|---|---|---|
| 10,922,625 B2 | 2/2021 | Ma et al. |
| 10,929,417 B2 | 2/2021 | Greene et al. |
| 11,429,638 B2 | 8/2022 | Dageville et al. |
| 11,594,312 B2 | 2/2023 | Wince et al. |
| 2003/0177117 A1 | 9/2003 | Vishnubhotla et al. |
| 2008/0005189 A1 | 1/2008 | Omura |
| 2008/0250057 A1 | 10/2008 | Rothstein et al. |
| 2009/0106190 A1 | 4/2009 | Srinivasan et al. |
| 2018/0218053 A1* | 8/2018 | Koneru ................ G06F 3/0482 |
| 2020/0019911 A1* | 1/2020 | Powers ............ G06Q 10/06393 |
| 2020/0026711 A1 | 1/2020 | Blom et al. |

* cited by examiner

New Layout 106

| Attribute XY 204 | Attribute BV 206 | Attribute BT 208 |
|---|---|---|
| KJH | A6$D | LOM |
| KJH | JH6$ | NBY |
| KJH | A56% | ABC |
| KJH | JHT4 | GFD |
| KJH | NHY | MNU |

Existing Layout 108

| Attribute NB 212 | Attribute EF 214 | Attribute TY 216 |
|---|---|---|
| GTDV5 | NHY | GTR43 |
| MNJ876 | NB@4 | GTR44 |
| BGTR4# | J$3E | GTR45 |
| MNJ8UT5 | BG5$ | GTR46 |
| KUT45T | A6$D | GTR47 |

Final Layout 114

| Attribute XY 222 | Attribute EF 224 | Attribute BT 226 |
|---|---|---|
| KJH | NHY | LOM |
| KJH | NB@4 | NBY |
| KJH | J$3E | ABC |
| KJH | BG5$ | GFD |
| KJH | A6$D | MNU |

DYNAMIC SCHEMA IDENTIFICATION TO PROCESS INCOMING DATA FEEDS IN A DATABASE SYSTEM

TECHNICAL FIELD

The present disclosure relates generally to data processing, and more specifically to dynamic schema identification to process incoming data feeds in a database system.

BACKGROUND

In computing systems, Extract, Transform, Load (ETL) is a type of data integration method that refers to the three steps (extract, transform, load) used to blend data from multiple sources. ETL is often used to build a data warehouse. During this process, data is taken (extracted) from a source system, converted (transformed) into a format that can be analyzed by one or more target systems, and stored (loaded) into a data warehouse or other system. ETL processes use pre-defined logic in order to transform data from various source systems. Data received from several data sources may include duplicate data resulting in the same data being stored in the data warehouse several times leading to memory wastage.

SUMMARY

The system and methods implemented by the system as disclosed in the present disclosure provide technical solutions to the technical problems discussed above by providing techniques to avoid duplicate processing and storing of the same data in a data warehouse system. The disclosed system and methods provide several practical applications and technical advantages. For example, the disclosed system provides the practical application of improving processing efficiency and memory utilization of computing systems that implement a data warehouse. As described in accordance with embodiments of the present disclosure, upon receiving a new data layout from a data source, a data manager of the data warehouse system determines a data domain to which the new data layout belongs to and compares the new data layout with other existing data layouts known to belong to the same data domain. If one or more attributes and corresponding datasets match with corresponding attributes and datasets from existing data layouts, data manager generates a final data layout or schema that is a copy of the new data layout with the matching attributes and datasets of the new data layout replaced with corresponding attributes and datasets from the existing data layouts. By reusing data from existing data layouts, the disclosed system and methods avoid unnecessary re-processing and duplicate storage of the same data resulting in more efficient usage of processing and memory resources. This generally improves the technology related to ETL processing in data warehouses.

The disclosed system and methods provide an additional practical application of quickly and efficiently determining attributes and datasets from one or more existing data layouts that match with corresponding attributes and datasets of a new data layout. As described in accordance with embodiments of the present disclosure, the data manager may use a machine learning model to compare a new data layout with existing data layouts. For example, during a training phase of the machine learning model, for each data domain, the data manager may provide the machine learning model a plurality of existing data layouts known to belong to the data domain. The machine learning model reads and analyzes each existing data layout and learns the attributes and dataset of the existing data layouts. At the end of the training phase, the machine learning model may have learnt to identify attributes and datasets of a new data layout that are same or similar to attributes and datasets of an existing data layout. Thus, when comparing a new data layout with an existing data layouts of a data domain, the trained machine learning model can quickly carry out the comparison without analyzing each existing data layout. This efficient comparison of new data layouts with existing data layouts improves processing efficiency of computing systems that implement ETL processes to extract data from new data layouts.

Certain aspects of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates generation of a final data layout based on a comparison of a new data layout and an existing data layout, in accordance with embodiments of the present disclosure;

DETAILED DESCRIPTION

ETL is a type of data integration method for copying data from one or more sources into a destination system which represents the data differently from the source(s) or in a different context than the source(s). Data extraction typically involves extracting data from homogeneous or heterogeneous sources. Data transformation includes processing data by transforming into a proper storage format/structure for the purposes of querying and analysis. Finally, data loading includes storing the data into a final target database such as an operational data store, a data mart, data lake or a data warehouse. The integrated data loaded by an ETL tool into the target database may be used by one or more target systems for data analysis and reporting. ETL is a proven method that many organizations rely on every day such as retailers who need to see billing data regularly. ETL can combine and surface data from a warehouse or other data store so that it's ready for processing by a target system in a desired format. ETL is also used to migrate data from legacy systems to modern systems with different data formats. It's often used to consolidate data from organizational mergers, and to collect and join data from external suppliers or partners. For example, an organization may use ETL to integrate data from multiple operational system (e.g., payroll and billing). An operational system is a term used in data warehousing to refer to a system that is used to process the day-to-day interactions of an organization.

The ETL process uses ETL logic to transform data received from source systems into desired formats. The ETL logic typically includes a set of rules which is designed based on the target systems configured to further process the transformed data. For example, when migrating data from legacy source systems to modern target systems, ETL logic may be designed to transform data from one or more legacy formats as retained in the source system to a new format used by a modern target system. In one example use case, if an organization has been managing data in oracle databases previously and now wants to migrate the data to SQL server cloud database, ETL processes may be used to carry out the data migration based on ETL logic designed to transform data formats used by oracle databases to data formats used by SQL server.

System Overview

Figure 1:
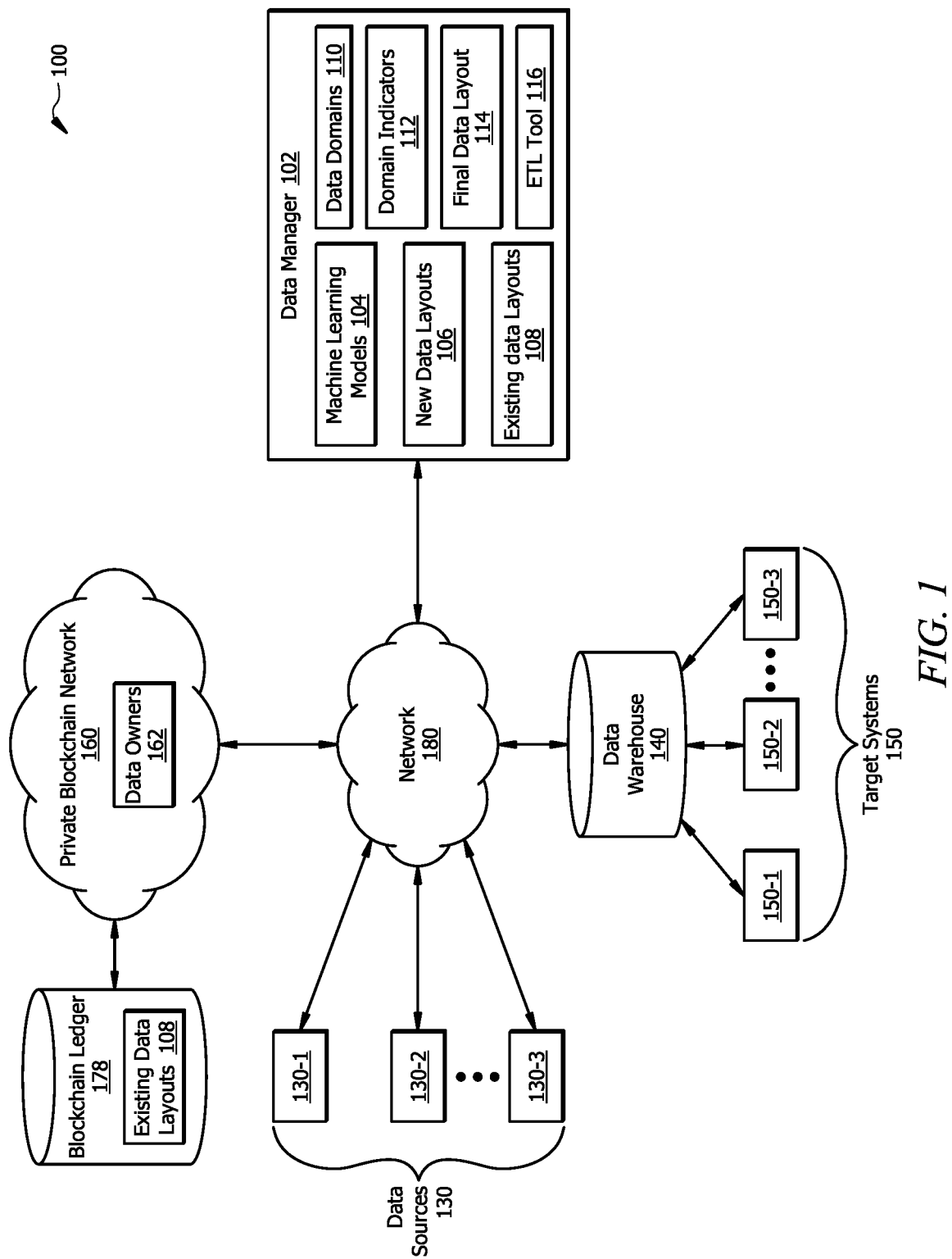
FIG. 1 is a schematic diagram of an example data warehousing system, in accordance with certain embodiments of the present disclosure.

FIG. 1 is a schematic diagram of an example data warehousing system 100, in accordance with certain embodiments of the present disclosure. The system 100 may be implemented in any system that uses an ETL process such as a data warehousing system.

It may be noted that while the following disclosure describes methods for avoiding data duplication with reference to a data warehouse system, the disclosed system and methods equally apply to any system environment that uses an ETL process to integrate data from several source systems and/or applications.

As shown in FIG. 1, system 100 includes data sources 130 (including source systems 130-1, 130-2 to 130-N), data warehouse 140, target systems 150 (including target systems 150-1, 150-2 to 150-N), a data manager 102 and private blockchain 160, each connected to a network 180. The network 180, in general, may be a wide area network (WAN), personal area network (PAN), a cellular network, or any other technology that allows devices to communicate electronically with other devices. In one or more embodiments, the network 180 may be the internet.

Data sources 130 may include systems and applications run by those systems that provide data to the data manager 102. For example, in a data migration use case as described above, data sources 130 may include legacy systems that store data in one or more legacy formats. Data sources 130 may also include operational systems of an organization that process data-to-day interactions of the organization. For example, in a banking use case, the data sources 130 may include front desk systems that process customer's loan applications, systems at individual bank branches that process funds deposit/withdrawal, trading systems processing trades and the like. One or more of the data sources 130 may also include servers that store reference data common across an organization's systems including customer data, employee data, vendors data and the like.

Data manager 102 may include ETL tool 116 that may be configured to integrate data received from several data sources 130 and store the integrated data in the data warehouse 140. The ETL tool 116 may be configured to perform three steps namely data extraction, data transformation and data loading. Data extraction involves extracting data from one or more data sources 130. Data transformation includes processing the received data by transforming into a pre-defined format or structure. Finally, data loading includes storing the transformed data into the data warehouse 140. The integrated data loaded into the data warehouse may be accessed by one or more target systems 150 for further processing.

ETL tool 116 may use pre-defined ETL logic to transform data received from data sources 130 into desired formats. The ETL logic may include a set of rules which is designed based on data format and/or data structure requirements of the target systems 150 configured to further process the transformed data stored in the data warehouse 140. For example, when migrating data from legacy data sources 130 to modern target systems 150, the ETL logic may be designed to transform data from one or more legacy formats as retained in the data sources 130 to a new format used by a modern target system 150. In one example use case, if an organization has been managing data in oracle databases previously and now wants to migrate the data to SQL server cloud database, ETL processes may be used to carry out the data migration based on ETL logic designed to transform data formats used by oracle databases to data formats used by SQL server.

Target systems 150 may include systems and software applications run by those systems that consume and process data received from the data sources 130 and loaded into the data warehouse 140. Target systems 150 may be configured to perform data analysis and reporting based on the data received from data sources 130. For example, in the data migration use case described above, a target system 150 may include a modern system that processes data in one or more new formats. In a banking use case, a target system 150 may be a ledger system which collects data from several source bank systems and performs ledger balancing. Additionally or alternatively, target systems 150 may be configured to perform one or more processing steps based on the data received from data sources 130. For example, in the data migration use case, the target system 150 may be configured to perform data analysis and reporting based on data that was transformed to the one or more new formats.

Private blockchain network 160 may include a plurality of computing nodes of an organization's computing infrastructure connected to a private network. The private network connecting the computing nodes of the private blockchain network 160 may be communicatively coupled to the network 180. As shown in FIG. 1, the private blockchain network 160 may store a blockchain ledger 178. One or more computing nodes of the private blockchain network may be owned and/or used by data owners 162 belonging to several data domains 110. Each data domain 110 identifies a type of data or a type of a data source 130. For example, each data domain 110 may identify a set of data sources 130 that feed a certain type of data to the data warehouse 140. For example, sources 130 include several operational systems of an organization such as payroll, billing and receivables. In this example, payroll data may be assigned to a payroll data domain, billing data may be assigned to a billing data domain and receivables data may be assigned to a receivables data domain. A large corporation may have hundreds of different operational systems feeding in data to the data warehouse 140. Thus, a large corporation may have hundreds of data domains 110 each corresponding to a different type of data source(s) or data received from a respective operational system of the corporation. A data owner 162 of a data domain 110 may include an administrator of the data domain 110.

A blockchain generally is an open, decentralized and distributed digital ledger (e.g., blockchain ledger 178) consisting of records called blocks that are used to record data interactions across many computing nodes. Each computing node of a blockchain network (e.g., private blockchain network 160) may maintain a copy of the blockchain ledger. Logically, a blockchain is a chain of blocks which contains specific information. Once recorded, the data in any given block cannot be altered retroactively without alteration of all subsequent blocks, which requires consensus of the network majority. Each computing node within the blockchain network maintains, approves, and updates new entries. The system is controlled not only by separate individuals, but by everyone within the blockchain network. Each member ensures that all records and procedures are in order, which results in data validity and security. Thus, the distributed ledger can record interactions between two parties efficiently and in a verifiable and permanent way. By design, a blockchain is resistant to modification of the data. For use as a distributed ledger, a blockchain is typically managed by a peer-to-peer network collectively adhering to a protocol for inter-node communication and validating new blocks. In the context of the present disclosure, each computing node of the private blockchain network 160 may store a copy of a blockchain ledger 178, wherein each copy of the blockchain ledger 178 includes a copy of the blockchain associated with the private blockchain network 160

Each computing node of a blockchain network (e.g., private blockchain network 160) is configured to process new blocks generated for the blockchain and maintain a most recent copy of the blockchain in the respective ledgers. Any new interaction or activity within the blockchain network may trigger the building of a new block of the blockchain. An interaction may include a computing node of the blockchain network transmitting or receiving data from another computing node of the blockchain network or from a computing node that is not part of the blockchain network. Before a new block is added to the blockchain, it needs to be verified by a majority of the computing nodes in the blockchain network. For example, once a new block is created at a computing node belonging to the private blockchain network 160, the new block is sent to each other computing node in the private blockchain network 160. Each other computing node verifies the new block and checks whether the information stated in the new block is correct. Once approved by a majority of the computing nodes, the new block is added to the blockchain of the private blockchain network 160. Once a new block is approved for addition to the blockchain, each of the computing nodes of the private blockchain network 160 may be configured to update a local copy of the blockchain persisted in the respective ledger to reflect the addition of the new block.

Each block of the blockchain includes a hash of the block, a hash of the previous block, data that records one or more interactions or activities associated with the block, and a timestamp of the one or more interactions or activities recorded by the block. The data stored in each block depends on the type of blockchain. For example, the data included in each block may include information relating to the interaction recorded by the block including transmitting/receiving data, details of the data files, a copy of data received or generated as part of the interaction, identities of the sending and receiving nodes involved in the interaction etc. A hash of a block is like a fingerprint that uniquely identifies the block (and the interaction or activity recorded by the block) within the blockchain. Each hash of a block is generated based on a cryptographic hash algorithm. A blockchain network uses public-key cryptography to securely transfer data between computing nodes. Public-key cryptography uses a combination of a public key and private key to secure data in a blockchain network so that only the rightful owner of data can access the data. A public key is like an address on the blockchain to which data may be sent and recorded as belonging to that address. A private key is like a password that gives a user access to digital possessions recorded against a public key.

The private blockchain network 160 may be a permissioned blockchain network owned and controlled by one or more administrators via respective computing nodes of the private blockchain network 160. For example, an administrator may hold all rights to the private blockchain network 160 and may decide which computing node may join the private blockchain network 160. The administrator may further selectively provide rights to each computing node including rights to access information (e.g., stored in data files) from particular blocks of the private blockchain associated with the private blockchain network 160, read/extract data stored in certain blocks, modifying data stored in certain blocks and generate new blocks.

In one or more embodiments, each of the data sources 110, data warehouse 140, target systems 120, data manager 102 and each computing node in the private blockchain network 160 may be implemented by a computing device running one or more software applications. For example, one or more of the data sources 110, data warehouse 140, target systems 120, data manager 102 and computing nodes in the private blockchain network 160 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the data sources 110, data warehouse 140, target systems 120, data manager 102 and computing nodes in the private blockchain network 160 may be representative of a server running one or more software applications to implement respective functionality as described below. In certain embodiments, one or more of the data sources 110, data warehouse 140, target systems 120, data manager 102 and computing nodes in the private blockchain network 160 may run a thin client software application where the processing is directed by the thin client but largely performed by a central entity such as a server (not shown).

As described above, several data sources 130 may feed data to the data manager 102, wherein different data sources 130 may be associated with different operational systems. Data manager 102 may process the data feeds received from the data sources 130 using the ETL tool before loading the received data into the data warehouse 140 for consumption by one or more target systems 150. Data files received from the data sources 130 may be in the form of data layouts (e.g., new data layouts 106), wherein each new data layout 106 received from a respective data source 130 includes one or more attributes and a dataset corresponding to each attribute. For example, a data layout received from a data source 130 may be in the form of a data table containing a plurality of columns and rows, wherein each column corresponds a data type and each row corresponds to a data record. Each data type of a column is an attribute and the data in data fields of that column constitutes the dataset corresponding to that attribute.

Often, data layouts received from different data sources 130 may include duplicate data. Two or more different data layouts received from different data sources 130 may include a same attribute and corresponding dataset. For example, a first data layout received from an employee system having employee data and a second data layout received from a payroll system having payroll data may include several common attributes or data types including employee names, employee identifications (IDs) and other attributes corresponding to other employee information. One or more of these common attributes may have different names in the different data layouts but may include the same dataset. Current ETL systems do not have the intelligence to detect and identify duplicate attributes and datasets across data layouts received from different data sources 130. Accordingly, the current ETL systems process and load multiple copies of the same attributes and datasets wasting precious processing and memory resources.

Embodiments of the present disclosure describe techniques for intelligently detecting and identifying duplicate attributes and datasets across data layouts received from different data sources and avoiding duplicate processing and storing of the same attributes and the datasets.

Data manager 102 may be configured to receive new data layouts 106 from data sources 130, perform ETL processing on the new data layouts 106 using ETL tool 116 and load the data received in the new data layouts 106 into the data warehouse 140. Data manager 102 may be configured to store already processed new data layouts 106 (e.g., using ETL tool 116) as existing data layouts 108 in the private blockchain network 160, for example, in the blockchain ledger 170. Additionally or alternatively, the data manager 102 may store the existing data layouts 108 in a memory associated with the data manager 102.

When the data manager 102 receives a new data layout 106 from a data source, data manager 102 may be configured to classify the new data layout 106 as being associated with one of a plurality of data domains 110. As described above, the data domain 110 associated with a data layout is indicative of a type of data source 130 the data layout is received from and/or a type of data the data layout contains. The data manager 102 may use a machine learning model 104 to accomplish the classification of a new data layout 106 to a data domain 110. Data manager 102 may be configured to train the machine learning model 104 to identify a plurality of domain indicators 112 in a new data layout 106. Each data domain 110 may be associated with a unique set of domain indicators 112, wherein domain indicators 112 associated with a particular data domain 110 can be used to identify new data layouts 106 that belong to that data domain 110. The unique set of domain indicators 112 associated with each data domain 110 may include a set of keywords that are most commonly found in data layouts belonging to the data domain 110. Thus, if a new data layout 106 includes the set of domain indicators 112 associated with a particular data domain 110, i.e. if the new data layout 106 includes the set of keywords most commonly found in data layouts belonging to the particular data domain 110, there is a high likelihood that the new data layout 106 also belongs to the particular data domain 110.

In a training phase, for each data domain 110, data manager 102 provides the machine learning model 104 a plurality of data layouts that are already classified as belonging to the data domain 110. The machine learning model 104 analyzes each data layout and identifies a set of most found keywords in the data layout. For example, the machine learning model 104 may identify a preselected number of most found keywords (e.g., a top 10, top 20, top 50 or top 100) in each data layout belonging to the data domain. Once, a set of preselected number of keywords have been identified for all data layouts belonging to the data domain, the machine learning model 104 compares all the sets of keywords and determines a common set of keywords most found across all the sets of keywords identified for all data layouts belonging to the data domain. The common set of keywords may include a preselected number of keywords (e.g., a top 10, top 20, top 50 or top 100). The common set of keywords is then designated as the set of domain indicators 112 for the data domain. The machine learning model 104 performs the same set of tasks with respect to each data domain and determines a unique set of domain indicators 112 for each data domain. For example, the machine learning model 104 determines a first set of domain indicators 112 corresponding to a first data domain, determines a second set of domain indicators 112 corresponding to a second data domain, and so on.

In a real-world phase, the data manager 102 may use the trained machine learning model 104 to classify new data layouts 106 to one of the plurality of data domains 110. When the data manager 102 receives a new data layout 106 from a data source 130, the trained machine learning model 104 analyses the new data layout 106 and identifies a set of most found keywords (e.g., top 10, top 20, top 50, top 100 etc.) in the new data layout 106. The machine learning model 104 then compares the set of keywords identified from the new data layout 106 with the domain indicators 112 (as determined during the training phase described above) of each of the plurality of data domains 110. When the set of keywords from the new data layout 106 match at least a threshold number of domain indicators 112 of a particular data domain 110, the machine learning model 104 initially classifies the new data layout as belonging to the particular data domain 110. For example, the machine learning model 104 classifies the new data layout 106 as belonging to a data domain 110 when at least 80% of the domain indicators 112 associated with the data domain 110 are found in the set of keywords identified in the new data layout 106. In one embodiment, the machine learning model 104 classifies the new data layout 106 as belonging to a data domain 110 when all domain indicators 112 associated with the data domain 110 are found in the set of keywords identified in the new data layout 106. In an alternative embodiment, instead of identifying a set of keywords in the new data layout 106 and then comparing the set of keywords with the domain indicators 112 of different data domains 110, the machine learning model 104 may search the domain indicators 112 of each data domain 110 in the new data layout 106. When a threshold number of domain indicators 112 of a data domain are found in the new data layout 106, the machine learning model 104 classifies the new data layout 106 as belonging to the data domain.

Once the new data layout 106 is initially classified as belonging to a data domain 110, the data manager 102 performs a confirmation step to verify the classification made by the machine learning model. As part of the confirmation step, data manager 102 may compare the classified new data layout 106 with existing data layouts already known to belong to the same data domain 110. When the new data layout 106 matches with an existing data layout known to belong to the data domain 110, data manager 102 finally classifies the new data layout 106 as belonging to the data domain 110. In one embodiment, the data manager 102 may use the machine learning model 104 for the confirmation step. For example, during a training phase of the machine learning model 104, the data manager 102 may provide the machine learning model 104 a plurality of existing data layouts 108 known to belong to a particular data domain 110. The machine learning model reads and analyzes each existing data layout 108. At the end of the training phase, the machine learning model 104 may have learnt to identify data layouts that are similar to and/or same as the existing data layouts 108. Thus, when comparing an initially classified new data layout 106 with the existing data layouts 108 of a domain, the trained machine learning model 104 can quickly carry out the comparison without analyzing each existing data layout 108.

In one or more embodiments, when a new data layout 106 that was initially classified as belonging to a data domain 110 fails to match with an existing data layout 108 known to belong to the same data domain 110, data manager 102 initiates a blockchain data interaction in the private blockchain network 160 and sends to one or more computing nodes of the blockchain network 160 a request for approval of the classification of the new data layout 106 to the initially classified data domain 110. The request for approval may include a copy of the new data layout 106 and an identity of the data domain 110 to which the new data layout 106 was initially classified. As described above, the private blockchain network may include data owners 162 (e.g., administrators) for each of the data domains 110. The request for approval may be sent to one or more computing nodes of the blockchain network 160 that are registered to data owners 162 of the data domain 110 to which the new data layout 106 was initially classified. The data owners 162 of the data domain 110 may inspect the new data layout 106 and either approve or reject the request. Upon receiving an approval from one or more data owners 162, data manager 102 may finally classify the new data layout 106 as belonging to the data domain 110 to which the new data layout 106 was initially classified. In one embodiment, the finally classified new data layout 106 may be added to the existing data layouts 108 as an existing data layout known as belonging to the finally classified data domain 110.

Once the new data layout 106 has been finally classified as belonging to a particular data domain 110, data manager 102 may be configured to search for and identify an existing data layout 108 in the same data domain 110 that includes at least one attribute and corresponding dataset of the new data layout 106. Existing data layouts 108 may include a set of existing data layouts 108 corresponding to each data domain 110 and that were previously classified and/or known to belong to the data domain 110. For example, the existing data layouts 108 may include a first set of existing data layouts 108 corresponding to a first data domain 110, a second set of existing data layouts 108 corresponding to the second data domain 110 and so on for each data domain 110. Data manager 102 may be configured to compare the new data layout 106, which was finally classified to a data domain 110, to one or more existing data layouts 108 corresponding to the same data domain 110. While comparing the new data layout 106 to the existing data layouts 108, data manager 102 may detect that one or more attributes and corresponding datasets of the new data layout 106 match with respective one or more attributes and corresponding data sets of one or more existing data layouts 108. For example, data manager 102 may identify that a first attribute and corresponding first dataset from the new data layout 106 matches with a second attribute and corresponding second dataset from an existing data layout 108 of the same data domain 110. In some embodiments, the first attribute and the first dataset may not exactly match with the second attribute and the second dataset. For example, a name of the first attribute may be different from the name of the second attribute, but the first dataset and the second data set may have the same or similar data values. In one embodiment, there may not be a one-to-one match between data values in the first dataset and the second dataset, but most data values from the first dataset may be found in the second data set. A threshold may be set for the extent of match needed between attributes and datasets. For example, data manager 102 may determine that the first attribute and first data set matches with the second attribute and the second dataset when a preset threshold number of data values match between the first dataset and the second dataset.

Data manager 102 may be configured to generate a final data layout 114 corresponding to the new data layout 106, wherein the final layout 114 (e.g., instead of the new data layout 106) is used for ETL processing of the new data layout 106 by the ETL tool 116. For example, the ETL tool 116 may process the data in the final data layout 114 and load the processed data into a data table of the data warehouse 140. In some embodiments, the final data layout 114 may also be called a schema. The terms "final data layout" and "schema" are used interchangeably in this disclosure. Following the example from the previous paragraph, data manager 102 may generate a final data layout 114 that is a copy of the new data layout 106 with the first attribute and the first dataset replaced with the second attribute and the second dataset from the existing data layout 108. This example is illustrated in FIG. 2.

FIG. 2 illustrates generation of a final data layout based on a comparison of a new data layout and an existing data layout, in accordance with embodiments of the present disclosure. As shown in FIG. 2, new layout 106 includes columns 204, 206 and 208 and respective datasets (e.g., data values) in each column. Existing layout 108 includes column 212, 214 and 216 and respective data sets in each column. In this example, attribute BV in column 206 of the new layout 106 matches with attribute EF in column 214 of the existing layout 108. However, columns 206 and 214 do not match exactly. As seen in FIG. 2, column 206 is titled "BV" and column 214 is titled "EF". Further, one-to-one mapping does not exist between columns 206 and 214. However, data values "A6$D" and "NHY" match between the two columns. It may be noted that only 5 records (i.e., 5 rows) are shown for the new data layout 106 and existing data layout 108. Usually, a data layout has hundreds or even thousands of data records. For this example, it may be assumed that column 206 matches with column 214. As shown in FIG. 2, the final data layout 114 generated corresponding to new layout 106 is a copy of the new data layout 106 with column 206 and corresponding dataset replaced with column 214 and corresponding dataset from existing data layout 108.

In one embodiment, the final data layout 114 is a temporary data layout that is maintained in a memory of the data manager 102 until ETL processing of the final data layout 114 is completed. The final data layout 114 is deleted from the memory after the ETL processing is completed. In one embodiment, the final data layout 114 does not copy data from the new data layout 106 and the existing data layout 108. Instead, the final data layout 114 refers or links to the respective data from the new data layout 106 and the existing data layout 108. For example, columns 222 and 226 of the final data layout 114 may refer to columns 204 and 208 respectively of the new data layout 106, and column 224 of the final data layout 114 may refer to column 214 of the existing data layout 108. When performing ETL processing of the new data layout 106 based on the final data layout 114, ETL tool 116 extracts the actual attributes and datasets from the respective new and existing data layouts. For example, ETL tool 116 extracts data relating to columns 222 and 226 of the final data layout 114 from columns 204 and 208 respectively of the new data layout 106, and extracts data relating to column 224 of the final data layout 114 from column 214 of the existing data layout 108. By reusing data from existing data layouts 108, the disclosed system and methods avoid unnecessary re-processing of the same data resulting in more efficient usage of processing and memory resources. For example, the ETL tool 116 may process and load data from columns 204 and 208 of the new data layout 106 into the data warehouse 140, but may not process and load column 206 of the new data layout 106 into the data warehouse 140 as this data may already exist in the existing data layout 108. Instead, with regard to column 206, the ETL tool may add a reference in the data warehouse 140 to column 214 of the existing layout 108. In an alternative embodiment, the ETL tool 116 may load data relating to column 224 into the data warehouse 140 from the existing data layout 108 stored, for example, in the blockchain network (e.g., in the blockchain ledger 178).

In one embodiment, the data manager 102 may use a machine learning model 104 to compare the new data layout 106 with the existing data layouts 108. For example, during a training phase of the machine learning model 104, for each data domain 110, the data manager 102 may provide the machine learning model 104 a plurality of existing data layouts 108 known to belong to the data domain 110. The machine learning model reads and analyzes each existing data layout 108 and learns the attributes and dataset of the existing data layouts 108. At the end of the training phase, the machine learning model 104 may have learnt to identify attributes and datasets of a new data layout 106 that are same or similar to attributes and datasets of an existing data layout 108. Thus, when comparing a new data layout 106 with an existing data layouts 108 of a data domain 110, the trained machine learning model 104 can quickly carry out the comparison without analyzing each existing data layout 108.

In some embodiments, data manager 102 may detect that multiple attributes and corresponding datasets from a new data layout 106 match with respective attributes and datasets across multiple existing data layouts 108. For example, a first attribute and corresponding first dataset of the new data layout 106 may match with a second attribute and corresponding second data set of a first existing data layout 108. Additionally, a third attribute and corresponding third dataset of the new data layout 106 may match with a fourth attribute and corresponding fourth data set of a second existing data layout 108, wherein the first existing data layout 108 is different from the second existing data layout 108. In this case, the data manager 102 may generate a final data layout 114 which is a copy of the new data layout 106 with the first attribute and first dataset replaced with the second attribute and the second dataset of the first existing data layout, and with the third attribute and the third dataset replaced with the fourth attribute and the fourth data set of the second existing data layout.

In an additional or alternative embodiment, data manager 102 may be configured to compare two or more new data layouts 106 and generate one or more final data layouts 114 based on the comparison of the two or more new data layouts 106. In one example, data manager may receive a first new data layout, a second new data layout and a third new data layout from one or more data sources 130. The data manager 102 may first classify the first, second and third new data layouts as belonging to the same data domain 110. After the first, second and third new data layouts are classified as belonging to the same data domain 110, data manager 102 may compare the three new data layouts with each other to identify any matching attributes and datasets across the three new data layouts. For example, based on comparing the first, second and third new data layouts, data manager 102 may determine that a first attribute and corresponding first data set from the first new data layout matches with a second attribute and corresponding second dataset from the second new data layout. The data manager 102 may further determine that a third attribute and a corresponding third data set from the third new data layout matches with a fourth attribute and a corresponding fourth dataset from the second new data layout. In response to determining common attributes and datasets across the three new data layouts, data manager 102 may generate a single final data layout 114 that joins the first, second and third new data layouts and includes a single attribute and corresponding dataset corresponding to matching attributes across the three tables. In one embodiment, data manager 102 may base the final data layout 114 on the new data layout that contains the most matching attributes among the three new data layouts. For example, data manager 102 may base the final data layout on the second new data layout, wherein the final data layout 114 may include the second attribute, second dataset, fourth attribute and the fourth data set from the second new data layout and additionally include all remaining attributes and datasets from the three new data layouts that did not match with attributes and datasets of other new data layouts.

Before loading data from a final data layout 114 into one or more data tables of the data warehouse 140, data manager 102 may initiate an approval data interaction in the private blockchain network 160. The approval data interaction may be sent to one or more data owners 162 of the data domain 110 to which the new data layouts 106 based on which the final data layout 114 was generated belong to. After receiving approval from one or more data owners 162, data manager 102 may use the ETL tool to perform ETL processing of the final data layout 114 including loading data from the final data layout 114 to one or more data tables of the data warehouse 140.

Figure 3:
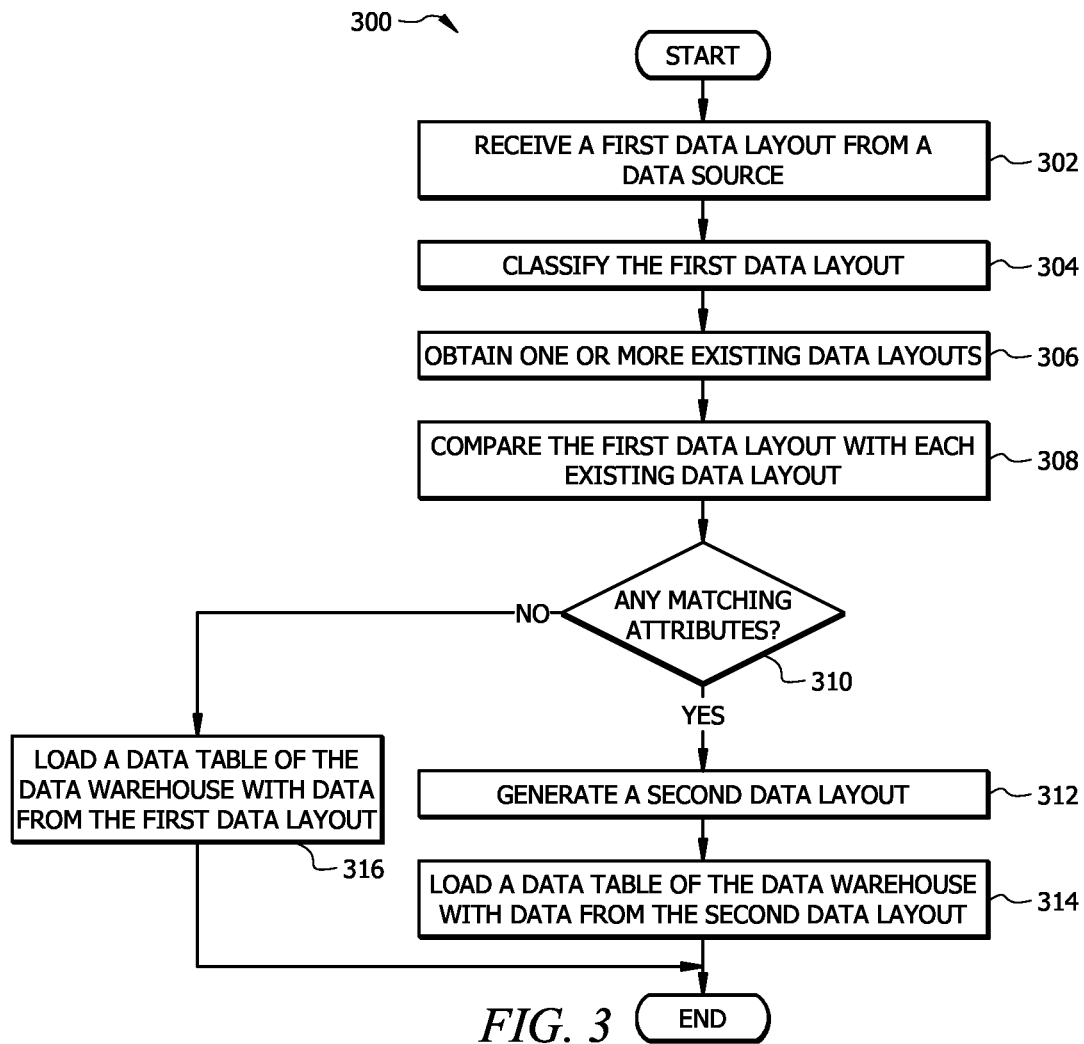
FIG. 3 is a flowchart of an example method for processing a new data layout, in accordance with embodiments of the present disclosure.

FIG. 3 is a flowchart of an example method 300 for processing a new data layout (e.g., new data layout 106), in accordance with certain embodiments of the present disclosure. Method 300 may be performed by the data manager 102 as shown in FIG. 1 and described above.

At operation 302, data manager 102 receives a first data layout (e.g., new data layout 106) from one of a plurality of data sources 130, wherein the first data layout includes at least one attribute and a dataset corresponding to the at least one attribute.

As described above, data manager 102 may be configured to receive new data layouts 106 from data sources 130, perform ETL processing on the new data layouts 106 using ETL tool 116 and load the data received in the new data layouts 106 into the data warehouse 140.

At operation 304, data manager 102 classifies the first data layout as corresponding to a first data domain 110 of a plurality of data domains 110, wherein each of the data domains 110 corresponds to a type of a data source 130.

As described above, when the data manager 102 receives a new data layout 106 from a data source, data manager 102 may be configured to classify the new data layout 106 as being associated with one of a plurality of data domains 110. The data domain 110 associated with a data layout is indicative of a type of data source 130 the data layout is received from and/or a type of data the data layout contains. The data manager 102 may use a machine learning model 104 to accomplish the classification of a new data layout 106 to a data domain 110. Data manager 102 may be configured to train the machine learning model 104 to identify a plurality of domain indicators 112 in a new data layout 106. Each data domain 110 may be associated with a unique set of domain indicators 112, wherein domain indicators 112 associated with a particular data domain 110 can be used to identify new data layouts 106 that belong to that data domain 110. The unique set of domain indicators 112 associated with each data domain 110 may include a set of keywords that are most commonly found in data layouts belonging to the data domain 110. Thus, if a new data layout 106 includes the set of domain indicators 112 associated with a particular data domain 110, i.e. if the new data layout 106 includes the set of keywords most commonly found in data layouts belonging to the particular data domain 110, there is a high likelihood that the new data layout 106 also belongs to the particular data domain 110.

At operation 306, data manager 102 obtains one or more existing data layouts 108 that are already classified as corresponding to the first data domain 110.

As described above, data manager 102 may be configured to store already processed new data layouts 106 (e.g., using ETL tool 116) as existing data layouts 108 in the private blockchain network 160, for example, in the blockchain ledger 108. Additionally or alternatively, the data manager 102 may store the existing data layouts 108 in a memory associated with the data manager 102.

At operation 308, data manager 102 compares the first data layout to each of the one or more existing data layouts.

As described above, once the new data layout 106 has been finally classified as belonging to a particular data domain 110, data manager 102 may be configured to search for and identify an existing data layout 108 in the same data domain 110 that includes at least one attribute and corresponding dataset of the new data layout 106. Existing data layouts 108 may include a set of existing data layouts 108 corresponding to each data domain 110 and that were previously classified and/or known to belong to the data domain 110. For example, the existing data layouts 108 may include a first set of existing data layouts 108 corresponding to a first data domain 110, a second set of existing data layouts 108 corresponding to the second data domain 110 and so on for each data domain 110. Data manager 102 may be configured to compare the new data layout 106, which was finally classified to a data domain 110, to one or more existing data layouts 108 corresponding to the same data domain 110. While comparing the new data layout 106 to the existing data layouts 108, data manager 102 may detect that one or more attributes and corresponding datasets of the new data layout 106 match with respective one or more attributes and corresponding data sets of one or more existing data layouts 108. For example, data manager 102 may identify that a first attribute and corresponding first dataset from the new data layout 106 matches with a second attribute and corresponding second dataset from an existing data layout 108 of the same data domain 110. In some embodiments, the first attribute and the first dataset may not exactly match with the second attribute and the second dataset. For example, a name of the first attribute may be different from the name of the second attribute, but the first dataset and the second data set may have the same or similar data values. In one embodiment, there may not be a one-to-one match between data values in the first dataset and the second dataset, but most data values from the first dataset may be found in the second data set. A threshold may be set for the extent of match needed between attributes and datasets. For example, data manager 102 may determine that the first attribute and first data set matches with the second attribute and the second dataset when a preset threshold number of data values match between the first dataset and the second dataset.

At operation 310, data manager 102 determines whether the at least one attribute and the corresponding dataset from the first data layout matches with a second attribute and corresponding second dataset of a first existing data layout 108 from the one or more existing data layouts 108. If the at least one attribute and the corresponding dataset do not match with a second attribute and a corresponding second dataset form an existing data layout, method 300 proceeds to operation 316 where data manager 102 loads a data table of the data warehouse 140 with data from the first data layout. However, if the at least one attribute and the corresponding dataset from the first data layout matches with a second attribute and corresponding second dataset of a first existing data layout 108, method 300 proceeds to operation 312.

At operation 312, data manager 102 generates a second data layout (e.g., final data layout 114) corresponding to the first data layout, wherein the second data layout is a copy of the first data layout with the at least one attribute and the corresponding dataset from the first data layout replaced by the second attribute and the second dataset from the first existing data layout 108.

As described above, data manager 102 may be configured to generate a final data layout 114 corresponding to the new data layout 106. As described with reference to FIG. 2, when a first attribute and corresponding first dataset from the new data layout 106 matches with a second attribute and corresponding second dataset from an existing data layout 108 of the same data domain 110, data manager 102 may generate a final data layout 114 that is a copy of the new data layout 106 with the first attribute and the first dataset replaced with the second attribute and the second dataset from the existing data layout 108.

At operation 314, data manager 102 loads a data table of the data warehouse 140 with data from the second data layout as part of ETL processing of the first data layout.

As described above, the final layout 114 (e.g., instead of the new data layout 106) is used for ETL processing of the new data layout 106 by the ETL tool 116. For example, the ETL tool 116 may process the data in the final data layout 114 and load the processed data into a data table of the data warehouse 140.

Figure 4:
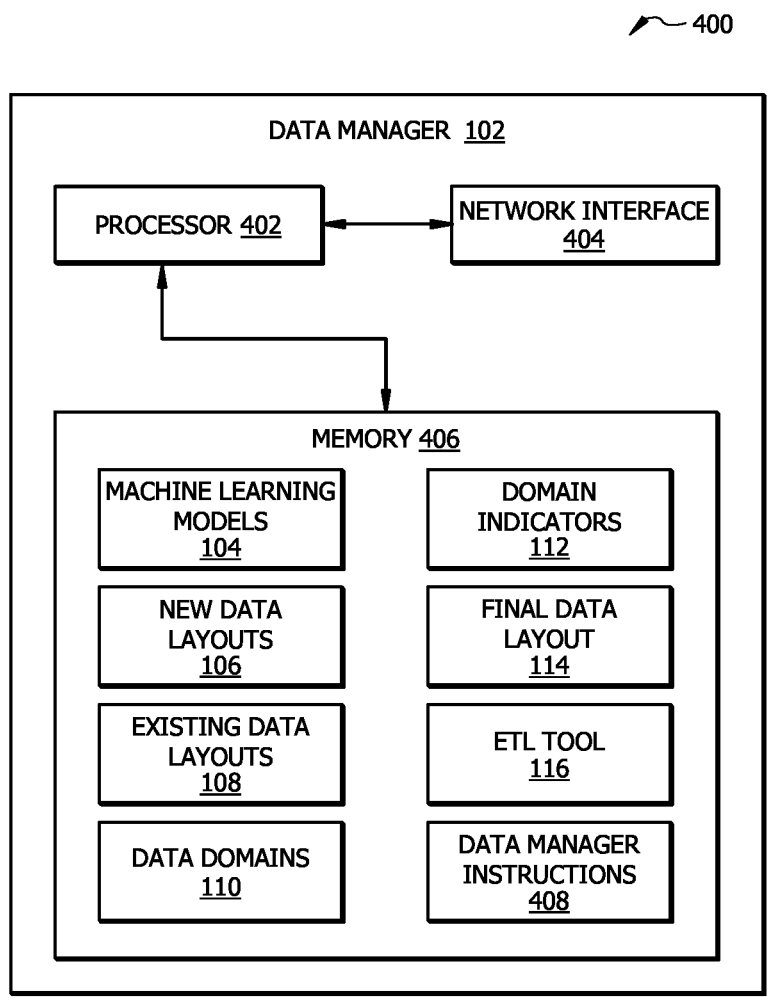
FIG. 4 illustrates an example schematic diagram of the data manager illustrated in FIG. 1, in accordance with one or more embodiments of the present disclosure

FIG. 4 illustrates an example schematic diagram 400 of the data manager 102 illustrated in FIG. 1, in accordance with one or more embodiments of the present disclosure.

Data manager 102 includes a processor 402, a memory 406, and a network interface 404. The data manager 102 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (data manager instructions 408) to implement the data manager 102. In this way, processor 402 may be a special-purpose computer designed to implement the functions disclosed herein. In one or more embodiments, data manager 102 is implemented using logic units, FPGAs, ASICs, DSPs, or any other suitable hardware. Data manager 102 is configured to operate as described with reference to FIGS. 1-3. For example, data manager 102 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store machine learning models 104, new data layouts 106, existing data layouts 108, data domains 110, domain indicators 112, final data layout 114, ETL tool 116 and data manager instructions 408. Data manager instructions 408 may include any suitable set of instructions, logic, rules, or code operable to execute the data manager 102.

The network interface 404 is configured to enable wired and/or wireless communications. The network interface 404 is configured to communicate data between the data manager 102 and other devices, systems, or domains (e.g. data sources 130, data warehouse 140, target systems 150, and private blockchain 160). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that each of the data sources 130, data warehouse 140, target systems 150, and computing nodes of the private blockchain 160 may be implemented similar to the data manager 102 as shown in FIG. 1. For example, each of the data sources 130, data warehouse 140, target systems 150, and computing nodes of the private blockchain 160 may include a processor and a memory storing instructions to implement the respective functionality of the system when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a data warehouse that stores data received from a plurality of data sources;
   a blockchain ledger of a blockchain network, wherein the blockchain ledger stores a plurality of existing data layouts, wherein each of the existing data layouts comprises one or more attributes and data corresponding to the one or more attributes; and
   at least one processor coupled to the data warehouse and the blockchain ledger, the at least one processor configured to:
      receive a first data layout from one of the data sources, wherein the first data layout comprises at least one attribute and a dataset corresponding to the at least one attribute;
      classify the first data layout as corresponding to a first data domain of a plurality of data domains, wherein each of the data domains corresponds to a type of a data source;
      obtain one or more of the existing data layouts that are already classified as corresponding to the first data domain;
      compare the first data layout to each of the one or more existing data layouts;
      detect that the at least one attribute and the corresponding dataset from the first data layout matches with a second attribute and corresponding second dataset of a first existing data layout from the one or more existing data layouts;
      generate a second data layout corresponding to the first data layout, wherein the second data layout is a copy of the first data layout with the at least one attribute and the corresponding dataset from the first data layout replaced by the second attribute and the second dataset from the first existing data layout; and
      load a data table of the data warehouse with data from the second data layout as part of extract, transform and load (ETL) processing of the first data layout.

2. The system of claim 1, wherein the at least one processor is further configured to:
   train a machine learning model based on the one or more existing data layouts that are classified as corresponding to the first data domain; and
   compare the first data layout to the one or more existing data layouts using the trained machine learning model, wherein the trained machine learning model identifies that the at least one attribute and the corresponding dataset of the at least one attribute from the first data layout matches with the second attribute and the corresponding second dataset from the first existing data layout.

3. The system of claim 1, wherein:
the at least one attribute of the first data layout comprises:
  a third attribute and a third dataset corresponding to the third attribute; and
  a fourth attribute and a fourth dataset corresponding to the fourth attribute;
the at least one processor is further configured to:
  based on the comparison of the first data layout with the one or more existing data layouts, detect that the third attribute and the third dataset matches with the second attribute and the second dataset from the first existing data layout, and that the fourth attribute and the fourth dataset matches with a fifth attribute and a corresponding fifth dataset from a second existing data layout; and
  the second data layout is a copy of the first data layout with the third attribute and third dataset replaced by the second attribute and the second dataset from the first existing data layout, and the fourth attribute and the fourth dataset replaced by the fifth attribute and the fifth dataset from the second existing data layout.

4. The system of claim 1, wherein:
the second data layout refers to the second attribute and second dataset from the first existing data layout stored in the blockchain ledger; and
the at least one processor is configured to load the data table of the data warehouse by:
  loading the second attribute and the second dataset from the first existing data layout stored in the blockchain ledger.

5. The system of claim 1, wherein the at least one processor is configured to:
  store the second data layout temporarily in a memory communicatively coupled to the at least one processor; and
  delete the second data layout from the memory after the ETL processing of the first data layout is completed.

6. The system of claim 1, wherein the at least one processor is further configured to:
  receive a third data layout and a fourth data layout from one or more of the data sources;
  classify the third data layout and the fourth data layout as corresponding to the first data domain;
  compare the first data layout, the third data layout and the fourth data layout with each other;
  detect that a first attribute and a corresponding first data set from the first data layout matches with a third attribute and a corresponding third dataset from the third data layout;
  detect that a fourth attribute and corresponding fourth data set from the fourth data layout matches with a fifth attribute and corresponding fifth data set from the third data layout;
  generate a fifth data layout that joins the first data layout, the third data layout and the fourth data layout, wherein the fifth data layout comprises the third attribute, the corresponding third dataset, the fifth attribute and the corresponding fifth data set from the third data layout, and further comprises other attributes and corresponding data sets from each of the first data layout, the third data layout and the fourth data layout that did not match with attributes and datasets from the other two of the first data layout, the third data layout and the fourth data layout; and
  load a second data table of the data warehouse with data from the fifth data layout as part of ETL processing of the first data layout, the third data layout and the fourth data layout.

7. The system of claim 1, wherein the at least one processor is further configured to:
  transmit an approval request corresponding to the second data layout to one or more computing nodes of the blockchain network;
  receive an approval corresponding to the second data layout from the one or more computing nodes; and
  load the data table of the data warehouse with the data form the second data layout in response to receiving the approval.

8. The system of claim 1, wherein the at least one processor is further configured to:
  after receiving the approval, add the second data layout to the existing data layouts.

9. A method for processing data layouts, comprising:
  receiving a first data layout from one of a plurality of data sources, wherein the first data layout comprises at least one attribute and a dataset corresponding to the at least one attribute;
  classifying the first data layout as corresponding to a first data domain of a plurality of data domains, wherein each of the data domains corresponds to a type of a data source;
  obtaining one or more of a plurality of existing data layouts that are already classified as corresponding to the first data domain, wherein each of the existing data layouts comprises one or more attributes and data corresponding to the one or more attributes;
  comparing the first data layout to each of the one or more existing data layouts;
  detecting that the at least one attribute and the corresponding dataset from the first data layout matches with a second attribute and corresponding second dataset of a first existing data layout from the one or more existing data layouts;
  generating a second data layout corresponding to the first data layout, wherein the second data layout is a copy of the first data layout with the at least one attribute and the corresponding dataset from the first data layout replaced by the second attribute and the second dataset from the first existing data layout; and
  loading a data table of a data warehouse with data from the second data layout as part of extract, transform and load (ETL) processing of the first data layout.

10. The method of claim 9, further comprising:
  training a machine learning model based on the one or more existing data layouts that are classified as corresponding to the first data domain; and
  comparing the first data layout to the one or more existing data layouts using the trained machine learning model, wherein the trained machine learning model identifies that the at least one attribute and the corresponding dataset of the at least one attribute from the first data layout matches with the second attribute and the corresponding second dataset from the first existing data layout.

11. The method of claim 9, wherein:
the at least one attribute of the first data layout comprises:
  a third attribute and a third dataset corresponding to the third attribute; and a fourth attribute and a fourth dataset corresponding to the fourth attribute;

further comprising:

based on the comparison of the first data layout with the one or more existing data layouts, detecting that the third attribute and the third dataset matches with the second attribute and the second dataset from the first existing data layout, and that the fourth attribute and the fourth dataset matches with a fifth attribute and a corresponding fifth dataset from a second existing data layout; and the second data layout is a copy of the first data layout with the third attribute and third dataset replaced by the second attribute and the second dataset from the first existing data layout, and the fourth attribute and the fourth dataset replaced by the fifth attribute and the fifth dataset from the second existing data layout.

12. The method of claim 9, wherein:

the second data layout refers to the second attribute and second dataset from the first existing data layout stored in a blockchain ledger; and loading the data table of the data warehouse comprises:
loading the second attribute and the second dataset from the first existing data layout stored in the blockchain ledger.

13. The method of claim 9, further comprising:

storing the second data layout temporarily in a memory communicatively coupled to the at least one processor; and deleting the second data layout from the memory after the ETL processing of the first data layout is completed.

14. The method of claim 9, further comprising:

receiving a third data layout and a fourth data layout from one or more of the data sources;

classifying the third data layout and the fourth data layout as corresponding to the first data domain;

comparing the first data layout, the third data layout and the fourth data layout with each other;

detecting that a first attribute and a corresponding first data set from the first data layout matches with a third attribute and a corresponding third dataset from the third data layout;

detecting that a fourth attribute and corresponding fourth data set from the fourth data layout matches with a fifth attribute and corresponding fifth data set from the third data layout;

generating a fifth data layout that joins the first data layout, the third data layout and the fourth data layout, wherein the fifth data layout comprises the third attribute, the corresponding third dataset, the fifth attribute and the corresponding fifth data set from the third data layout, and further comprises other attributes and corresponding data sets from each of the first data layout, the third data layout and the fourth data layout that did not match with attributes and datasets from the other two of the first data layout, the third data layout and the fourth data layout; and loading a second data table of the data warehouse with data from the fifth data layout as part of ETL processing of the first data layout, the third data layout and the fourth data layout.

15. The method of claim 9, further comprising:

transmitting an approval request corresponding to the second data layout to one or more computing nodes of the blockchain network;

receiving an approval corresponding to the second data layout from the one or more computing nodes; and load the data table of the data warehouse with the data form the second data layout in response to receiving the approval.

16. The method of claim 9, further comprising:

after receiving the approval, adding the second data layout to the existing data layouts.

17. A non-transitory computer-readable medium storing instructions that when executed by a processor cause the processor to:

receive a first data layout from one of a plurality of data sources, wherein the first data layout comprises at least one attribute and a dataset corresponding to the at least one attribute;

classify the first data layout as corresponding to a first data domain of a plurality of data domains, wherein each of the data domains corresponds to a type of a data source;

obtain one or more of a plurality of existing data layouts that are already classified as corresponding to the first data domain, wherein each of the existing data layouts comprises one or more attributes and data corresponding to the one or more attributes;

compare the first data layout to each of the one or more existing data layouts;

detect that the at least one attribute and the corresponding dataset from the first data layout matches with a second attribute and corresponding second dataset of a first existing data layout from the one or more existing data layouts;

generate a second data layout corresponding to the first data layout, wherein the second data layout is a copy of the first data layout with the at least one attribute and the corresponding dataset from the first data layout replaced by the second attribute and the second dataset from the first existing data layout; and load a data table of a data warehouse with data from the second data layout as part of extract, transform and load (ETL) processing of the first data layout.

18. The non-transitory computer-readable medium of claim 17, wherein the instructions further cause the processor to:

train a machine learning model based on the one or more existing data layouts that are classified as corresponding to the first data domain; and compare the first data layout to the one or more existing data layouts using the trained machine learning model, wherein the trained machine learning model identifies that the at least one attribute and the corresponding dataset of the at least one attribute from the first data layout matches with the second attribute and the corresponding second dataset from the first existing data layout.

19. The non-transitory computer-readable medium of claim 17, wherein:

the at least one attribute of the first data layout comprises:
a third attribute and a third dataset corresponding to the third attribute; and
a fourth attribute and a fourth dataset corresponding to the fourth attribute;

wherein the instructions further cause the processor to:
based on the comparison of the first data layout with the one or more existing data layouts, detect that the third attribute and the third dataset matches with the second attribute and the second dataset from the first existing data layout, and that the fourth attribute and the fourth dataset matches with a fifth attribute and a corresponding fifth dataset from a second existing data layout; and the second data layout is a copy of the first data layout with the third attribute and third dataset replaced by the second attribute and the second dataset from the first existing data layout, and the fourth attribute and the fourth dataset replaced by the fifth attribute and the fifth dataset from the second existing data layout.

20. The non-transitory computer-readable medium of claim 17, wherein:
the second data layout refers to the second attribute and second dataset from the first existing data layout stored in a blockchain ledger; and
loading the data table of the data warehouse comprises:
loading the second attribute and the second dataset from the first existing data layout stored in the blockchain ledger.

* * * * *